United States Patent Office 3,492,211
Patented Jan. 27, 1970

3,492,211
PREPARATION OF HALOGENATED
COMPOUNDS
Donald R. Pochowicz, Brookfield, and Ted Symon,
Lombard, Ill., assignors to Universal Oil Products
Company, Des Plaines, Ill., a corporation of
Delaware
No Drawing. Filed Apr. 28, 1966, Ser. No. 545,858
Int. Cl. B01j 1/10
U.S. Cl. 204—158        7 Claims

ABSTRACT OF THE DISCLOSURE

Compounds having the formula R—$CH_2$—A—$CH_2$—R can be halogenated by treatment with a halogenating agent such as elemental bromine in the presence of ultraviolet light to produce products comprising monohalogenated compounds having the formula R—$CH_2$—X and R—$CH_2$—A. R can be hydrogen, alkyl, aryl, cycloalkyl, alkaryl and aralkyl and A can be oxygen, sulfur, phosphorous and amino. X is halogen. Dibenzyl ether can be converted to benzyl bromide and benzaldehyde.

---

This invention relates to a process for preparing halogenated compounds. More particularly, the invention is concerned with a process for the photohalogenation of organic compounds whereby certain monohalogenated compounds and other selective compounds are recovered therefrom.

Certain monohalogenated organic compounds will find a wide variety of uses in the chemical field. For example, a halogenated aromatic compund such as benzyl bromide may be prepared utilizing the process of the present invention which is hereinafter set forth in greater detail. This benzyl bromide may be utilized as a substitute for benzyl chloride. These compounds may be used as a chemical intermediate in the preparation of essential oils, fragrances, agricultural, textile and rubber chemicals, plastics, resins, plasticizers, pharmaceuticals, dyes, or pigments. By utilizing the process of this invention it is possible to obtain the desired products in a relatively high yield, that is, about 90% or more of the theoretical, thus making the process commercially attractive to operate.

It is therefore an object of this invention to provide a process for the halogenation of organic compounds.

Another object of this invention is to provide a process for the photohalogenation of certain organic compounds whereby a monohalogenated compound an a selective compound which will possess utility as chemical intermediates may be obtained thereby.

In one aspect, an embodiment of this invention is found in a process which comprises treating a compound having the generic formula: R—$CH_2$—A—$CH_2$R in which R is selected from the group consisting of hydrogen, alkyl, aryl, cycloalkyl, alkaryl, and aralkyl radicals and A is selected from the group consisting of oxygen, sulfur, phosphorous, and amino radicals with a halogenating agent in the presence of ultraviolet light at halogenation conditions, and recovering the resultant monohalogenated compound.

A specific embodiment in this invention is found in a process for treating dibenzyl ether with elemental bromine at a temperature in the range of from about ambient to about 50° C. in the presence of ultraviolet light source which posseses a wave length less than about 3700 A., and recovering the resultant benzyl bromide and benzaldehyde.

Other objects and embodiments will be found in the following further detailed description of this invention.

As hereinbefore set forth, the present invention is concerned with a process for the halogenation of certain organic compounds and particularly to a method for the photohalogenation of these compounds whereby a monohalogenated compound and a specific compound of the type hereinafter set forth in greater detail will be obtained. The photohalogenation is effected by treating a compound having the generic formula:

R—$CH_2$—A—$CH_2$—R in which R is selected from the group consisting of hydrogen, alkyl, aryl, cycloalkyl, alkaryl, and aralkyl radicals and A is selected from the group consisting of oxygen, sulfur, phosphorous, and amino radicals with a halogenating agent in the presence of certain light sources of a type hereinafter set forth in greater detail, at halogenating conditions. These halogenating conditions will include a temperature in the range of from about ambient (approximately 25° C.) up to about 100° C. or more. While it is contemplated that the reaction will be effected at atmospheric pressure, it is within the scope of this invention to utilize super-atmospheric pressures ranging from about 2 to about 50 atmospheres or more, the amount of pressure being that which is sufficient to maintain a major portion of the reactants in the liquid phase.

Examples of compounds which possess the generic formula hereinbefore set forth which may be used as starting materials in the process of this invention include: dimethyl ether, diethyl ether, dipropyl ether, diisopropyl ether, dibutyl ether, dipentyl ether, dihexyl ether, diheptyl ether, dioctyl ether, dimethyl thioether, diethyl thioether, dipropyl thioether, diisopropyl thioether, dibutyl thioether, dipentyl thioether, dihexyl thioether, diheptyl thioether, dioctyl thioether, dimetyl amine, dietyl amine, dipropyl amine, diisopropyl amine, dibutyl amine, dipentyl amine, dihexyl amine, diheptyl amine, dioctyl amine, dimethyl phosphate, diethyl phosphate, dipropyl phosphate, diisopropyl phosphate, dibutyl phosphate, dipentyl phosphate, dihexyl phosphate, diheptyl phosphate, dioctyl phosphate, dibenzyl ether, dibenzyl thioether, dibenzyl amine, dibenzyl phosphate, dicyclopentyl ether, dicyclopentyl thioether, dicyclopentyl amine, dicyclopentyl phosphate, dicyclohexyl ether, dicyclohexyl thioether, dicyclohexyl amine, dicyclohexyl phosphate, diethyl phenyl ether, diethylphenyl thioether, diethylphenyl amine, diethylphenyl phosphate, etc. It is to be understood that the aforementioned compounds are only representative of the class of compounds which may undergo halogenation, and that the present invention is not necessarily limited thereto.

Examples of halogenating agents which may be used includes elemental bromine, chlorine, fluorine, iodine, hydrogen bromide, hydrogen chloride, hydrogen fluoride and hydrogen iodide, the preferred halogenating agent comprising elemental bromine.

The light source which may be used to effect the photohalogenation of the aforementioned compounds preferably comprises a light source which is ultraviolet in nature and which possesses wave lengths less than 3700 Angstrom units. Preferably speaking, the ultraviolet light should have a wavelength in the range of from about 1800 to 2400 Angstrom units. The ultraviolet light source may be obtained at any means known in the art, a particular source of energy being from a mercury arc which is either medium pressure or low pressure in nature.

The process of the present invention may be effected in either a continuous or batch type operation. For example, when a batch type operation is used, a quantity of the starting material comprising a compound of the type hereinbefore set forth is placed in a suitable reaction vessel. This vessel may be made of quartz, glass, or a synthetic material known as Vycor. The halogenating agent comprising for example, elemental bromine is slowy added during a predetermined period of time which may be from about 0.5 to about 3 hours or more. The resulting mixture is thoroughly stirred and heated to the desired temperature while subjecting the mixture to irradiation from a light source having a wave length of less than 3700 A. At the end of the desired reaction time, the irradiation is discontinued, the reaction vessel and the contents thereof are allowed to cool to room temperature, and the organic layer is washed with water, with a dilute alkali and extracted with ether. The ether layer is separated from the aqueous layer dried, and subjected to fractional distillation under reduced pressure whereby the desired products comprising the monohalogenated compound and a compound such as an aldehyde, amine, sulfide, phosphate, etc. are recovered.

It is also contemplated within the scope of this invention that the reaction of the present process is effected in a continuous manner of operation. When such a type of process is used, the desired compound is continuously charged to a reaction zone which is maintained at the proper operating conditions of temperature and pressure. In addition, the specific halogenating agent is also continuously charged thereto through separate means. The resulting mixture is subjected to irradiation from a light source having the desired length in the ultraviolet spectrum. After passage through the reaction vessel for a predetermined period of time, the reactor effluent is continuously withdrawn and subjected to a separation step whereby the unreacted starting materials are separated from the reaction products. The former are recycled to the reaction zone to form a portion of the feed stock, while the latter are subjected to fractional distillation to recover the desired products.

For example, when subjecting a dialkyl or diaryl amine to the process of this invention, it is possible to obtain a monohalo alkyl or aryl compound, as well as, an alkyl or aryl amino, the latter then being subjected to a further step to form an isocyano compound. Specific examples of monohalo compounds and other compounds which may be formed according to the process of this invention include methyl bromide, ethyl bromide, propyl bromide, isopropyl bromide, butyl bromide, sec-butyl bromide, pentyl bromide, benzyl bromide, cyclopentylmethyl bromide, cyclohexylmethyl bromide, methyl chloride, ethyl chloride, propyl chloride, isopropyl chloride, butyl chloride, sec-butyl chloride, pentyl chloride, benzyl chloride, cyclopentylmethyl chloride, cyclohexylmethyl chloride, benzaldehyde, acetaldehyde, propionic aldehyde, butyraldehyde, ethyl mercaptan, propyl mercaptan, butyl mercaptan, ethyl amine, propyl amine, isopropyl amine, etc. It is to be understood that the aforementioned compounds are only representative of the type of compounds which may be prepared according to the process herein described, and that the present process is not necessarily limited thereto.

The following examples are given to illustrate the process of the present invention which, however, are not intended to limit the generally broad scope of the present invention in strict accordance therewith.

EXAMPLE 1

In this example, 198 g. (1.0 mole) of benzyl ether was charged to a reaction flask provided with heating and stirring means. Following this, 158 g. (2.0 mole) of elemental bromine was added dropwise during a period of about 2 hours. The reaction mixture was continuously stirred while the flask and contents thereof were being exposed to irradiation from a light source having a wave length in the range of from about 3000 A. to about 3650 A. After about 110 g. of the bromine had been added to the benzyl ether, an organic diluent comprising 250 cc. of carbon tetrachloride was added, and the bromine addition was completed. Upon completion of the addition of bromine, the mixture was stirred and irradiated for an additional period of 4 hours. During this time the temperature of the reaction was maintained in a range of from about 25° to about 50° C.

At the end of the desired residence time, the mixture was quenched with water and sodium carbonate in an aqueous solution was added thereto. The mixture was extracted with ether, and the organic layer separated from the aqueous layer. The diluent was removed by vacuum and the product recovered. This product was then subjected to analysis by means of nuclear magnetic resonance and infra-red methods, there being recovered 80–90% of benzyl bromide and 10–20% of benzaldehyde.

EXAMPLE II

In this example, 214 g. (1.0 mole) of benzyl thioether is charged to a glass reaction flask provided with heating and stirring means. Following this, 158 g. (2.0 mole) of elemental bromine is slowly added dropwise during a period of about 2 hours. During the addition of the bromine, which is accompanied by continuous stirring, the flask and contents thereof are exposed to irradiation from a light source having a wave length of about 2400 A. Upon completion of the addition of the bromine, the contents are continuously stirred for an additional period of 4 hours. At the end of this time, the reaction mixture is washed with water, treated with aqueous sodium carbonate solution, and extracted with ether. The ether extracted layer is separated from the aqueous layer, following which the ether is removed under vacuum. Analysis of the reaction product by means of infra-red and nuclear magnetic resonance will disclose the presence of a major amount of benzyl bromide with a minor amount of benzyl sulfide.

EXAMPLE III

In this example, 129 g. (1.0 mole) of dibutyl amine is placed in a quartz reaction flask and 158 g. (2.0 mole) of bromine is slowly added thereto. During the addition of the elemental bromine and subsequent stirring for a total of about 6 hours, the flask and contents thereof are subjected to irradiation from ultraviolet light source having a wave length of about 3000 A. Upon completion of the desired residence time, the reaction mixture is treated in a manner similar to that hereinbefore set forth in Examples I and II. Analysis of the reaction product which is recovered after removal of the solvent, will disclose the presence of a major amount of butyl bromide and a minor amount of butyl amine.

EXAMPLE IV

In this example, 225 g. (1.0 mole) of dicyclohexylmethyl thioether is treated with 158 g. (2.0 mole) of elemental bromine in a glass flask which is subjected to irradiation from an ultraviolet light source having a wave length of about 2400 A., the total residence time being about 6 hours.

Nuclear magnetic resonance and infra-red analyses of the reaction product after treatment of said product in a manner similar to that set forth in Example I and removal of the solvent, will disclose the presence of a major portion of cyclohexylmethyl bromide and a minor proportion of cyclohexylmethyl sulfide.

EXAMPLE V

In this example, 282 g. (1.0 mole) of dioctyl ether is placed in a glass reaction flask, and 158 g. (2.0 mole) of elemental bromine is slowly added thereto during a period of 2 hours. The mixture is stirred for an additional period of 4 hours while subjecting said mixture to irradiation from an ultraviolet light source in the range of from about 3000 A. to about 3650 A. Upon completion of the desired residence time, the reaction product is washed with water, treated with an aqueous sodium carbonate, and extracted with ether. The organic layer is separated from the aqueous layer, and the solvent is removed by vacuum distillation. Infra-red and nuclear magnetic resonance analyses of the product will disclose the presence of a major proportion of octyl bromide and a minor proportion of caprylic aldehyde.

We claim as our invention:

1. A process for the preparation of a monohalogenated compound having the formula $$R_1\text{—}CH_2\text{—}X$$

or $$R_2\text{—}CH_2\text{—}X$$

in which $R_1$ and $R_2$ are as hereinafter specified and X is a halogen, which comprises treating a compound of the formula $$R_1\text{—}CH_2\text{—}A_1\text{—}CH_2\text{—}R_1$$

or $$R_2\text{—}CH_2\text{—}A_2\text{—}CH_2\text{—}R_2$$

in which $R_1$ is aryl, cycloalkyl, alkaryl or aralkyl; $A_1$ is oxygen, sulfur, phosphorous or amino radical; $R_2$ is hydrogen, alkyl or $R_1$; $A_2$ is sulfur, phosphorous or amino radical, with a halogenating agent comprising an elemental halogen or a hydrogen halide, in the presence of ultraviolet light at a temperature in the range of from about ambient to about 100 C., and a pressure sufficient to maintain a major portion of the reactants in the liquid phase, and recovering the resultant monohalogenated compound.

2. The process as set forth in claim 1, further characterized in that said ultraviolet light has a wave length of less than about 3700 A.

3. The process as set forth in claim 1, further characterized in that said halogenating agent comprises elemental bromine.

4. The process as set forth in claim 3, further characterized in that said compound comprises dibenzyl ether and said monohalogenated compound comprises benzyl bromide.

5. The process as set forth in claim 3, further characterized in that said compound comprises dibenzyl thioether and said monohalogenated compound comprises benzyl bromide.

6. The process as set forth in claim 3, further characterized in that said compound comprises dibutyl amine and said monohalogenated compound comprises butyl bromide.

7. The process as set forth in claim 3, further characterized in that said compound comprises dicyclohexylmethyl thioether and said monohalogenated compound comprises cyclohexylmethyl bromide.

References Cited

UNITED STATES PATENTS 2,811,485  10/1957  Evans _____ 204—158

HOWARD S. WILLIAMS, Primary Examiner